Figure 1:
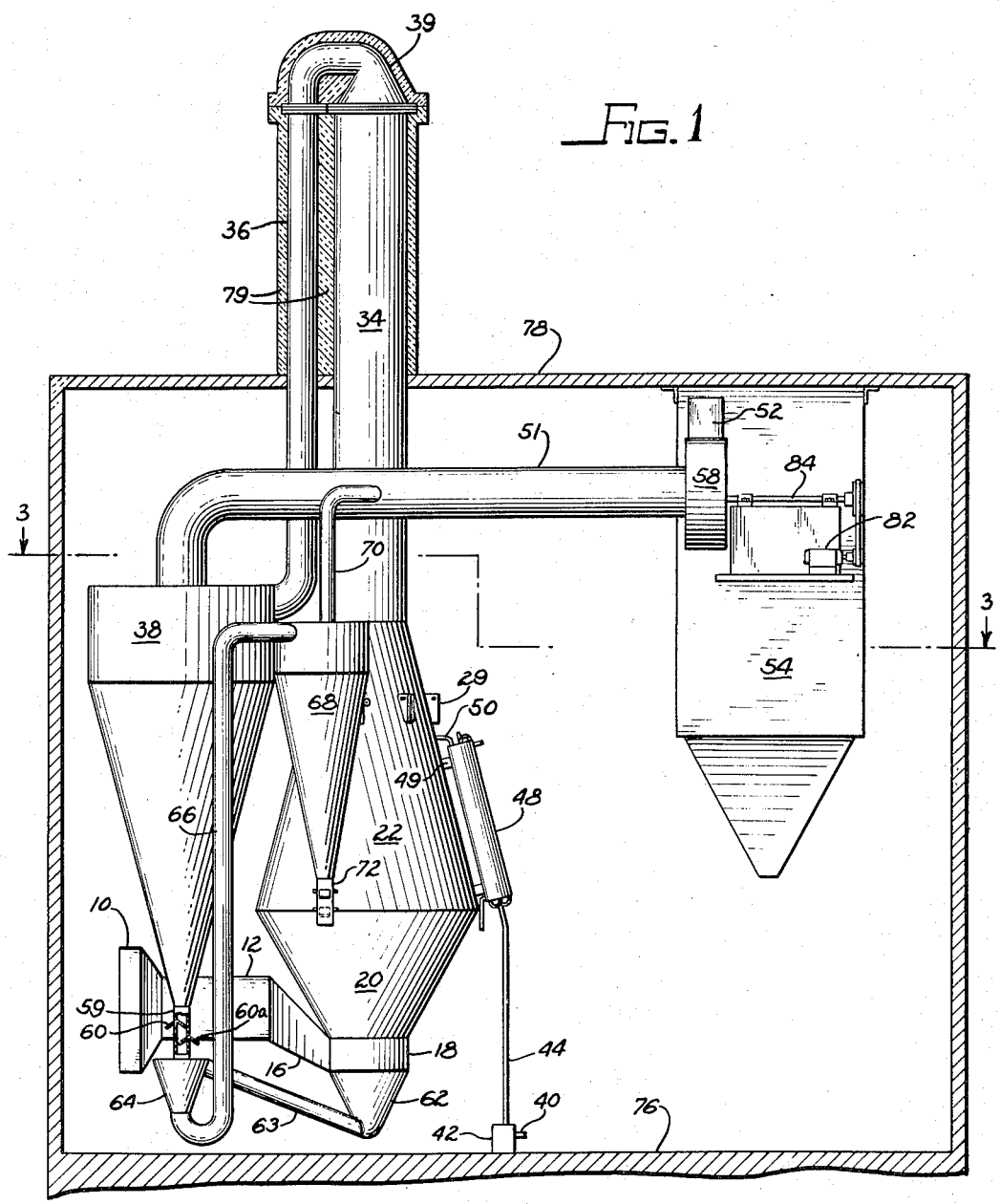
Figure 2:
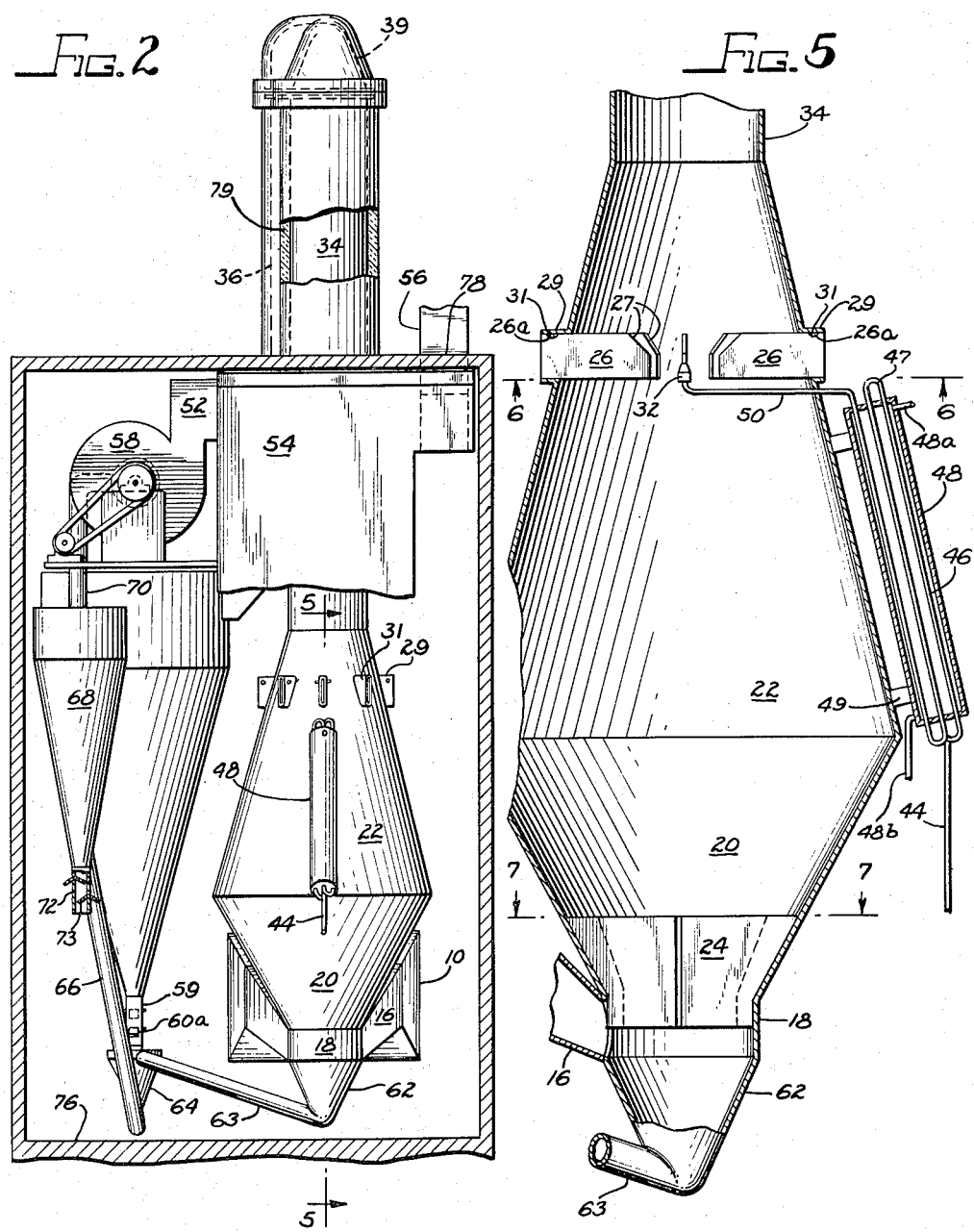
Figure 3:
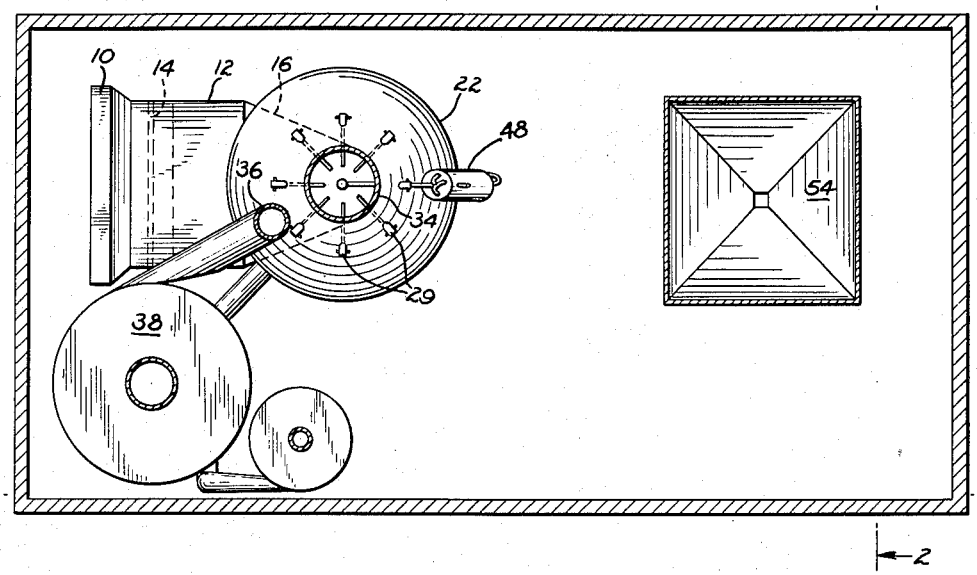
Figure 6:
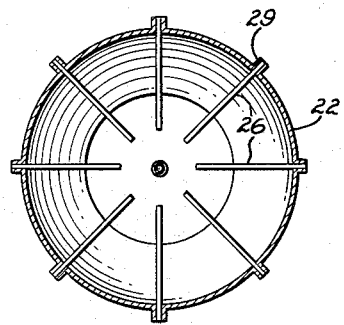
Figure 4:
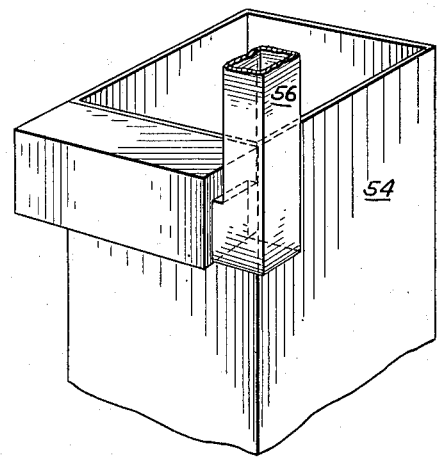
Figure 7:
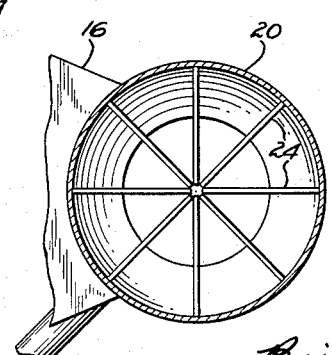

Feb. 7, 1956 S. T. COULTER ET AL 2,733,762
SPRAY DRIER
Filed April 19, 1950 5 Sheets-Sheet 1

Inventors
Samuel T. Coulter
William E. Hoyt
Samuel Van Deest
by:
Bair, Freeman & Molinare
Attys.

Feb. 7, 1956 S. T. COULTER ET AL 2,733,762
SPRAY DRIER
Filed April 19, 1950 5 Sheets-Sheet 3

Inventors
Samuel T. Coulter
William E. Hoyt
Samuel Van Deest
by:
Bair, Freeman & Molinare
attys.

Inventor
Samuel T. Coulter
William E. Hoyt
Samuel Van Deest
by: Bair, Freeman & Molinare
Attys.

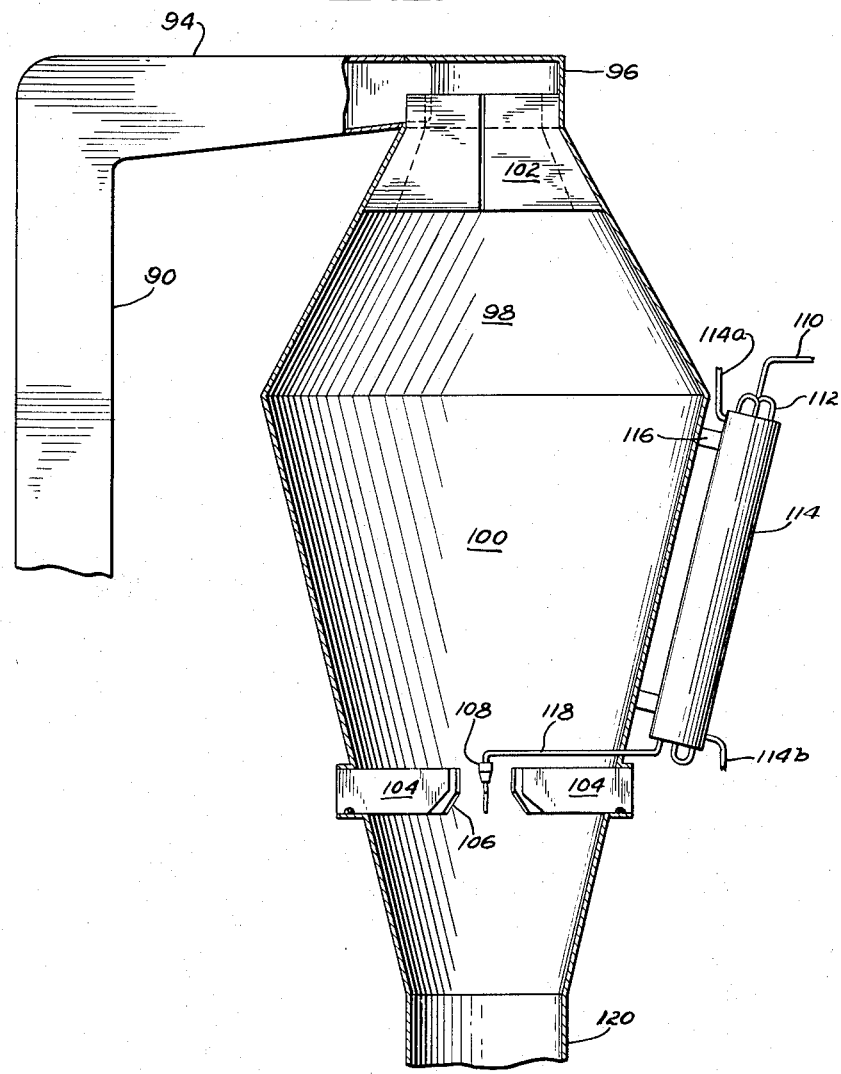

United States Patent Office 2,733,762
Patented Feb. 7, 1956

2,733,762

SPRAY DRIER

Samuel T. Coulter, St. Paul, Minn., William E. Hoyt, Colfax, Wis., and Samuel Van Deest, Chicago, Ill., assignors to Regents of The University of Minnesota, Minneapolis, Minn.

Application April 19, 1950, Serial No. 156,772

13 Claims. (Cl. 159—4)

This invention relates to apparatus for spray drying. While the invention is particularly directed to improvements in the spray drying of food stuffs, for instance, milk and other lacteal products, eggs, fruit juices and the like, the apparatus of this invention is also applicable to the dehydration of other materials.

The apparatus of the present invention includes a vertically extending apparatus comprising an air inlet duct provided with heating elements, a velocity unifying member which may be characterized by a double conical or convergent-divergent shape, a spray nozzle at the outlet end of the velocity unifying member and an elongated tubular spray duct or drying duct. The velocity unifying member serves to introduce the heated air into the spray duct at substantially uniform velocity throughout the cross sectional area of the spray duct.

By arranging the spray duct or drying duct vertically, it is possible to effect dehydration at a relatively slow rate of gas flow, since then no high gas velocities are required to prevent settling of sprayed particles onto the duct walls. The length of the drying duct can thus be greatly reduced, which is a considerable practical advantage. For spray drying apparatus, minimum total height is desirable, for excessive height represents an added housing or enclosing expense and renders the apparatus much less convenient to install and operate.

In the particular case where the gaseous drying medium flows upwardly, the gaseous medium need only flow at a velocity sufficient to overcome settling of the bulk of the sprayed particles under the influence of gravity. Further, the gravitational settling of the sprayed particles in the upwardly flowing column of gaseous drying medium brings about flow of the latter past each sprayed particle. Thus, the water vapor evolved from each particle is continuously displaced and replaced by gaseous drying medium of smaller moisture content, so that dehydration will take place more rapidly.

We have found that when the gaseous drying medium is introduced into the velocity unifying member through an air inlet duct having an angular or curved portion immediately upstream of the velocity unifying member, then the gaseous drying medium is not distributed uniformly over the cross-sectional area of the velocity unifying member. Actually, the greater part of the gaseous drying medium will then flow through the velocity unifying member along the far side wall of the latter, as viewed in the direction of flow in the air inlet duct upstream of the angular or curved portion of the latter. Such gas flow through the velocity unifying member destroys the function of the latter for the indicated purpose.

The reason for including a terminal curved or angular portion with the air inlet duct is to avoid the otherwise excessive total height of the spray drying apparatus.

We have found that when the direction of flow of the gaseous drying medium is changed as the medium flows from the air inlet duct into the velocity unifying member, uniform distribution of the gaseous medium over the cross-sectional area of the velocity unifying member can be effected by providing, at the inlet end of the velocity unifying member, a plurality of vertically and preferably radially extending baffles or fins that project into the air inlet duct. Thus, such fins or baffles make possible the flow through said vertical spray duct of gaseous drying medium with uniform distribution over the cross-sectional area of said duct.

We have noted, in spite of our provision of fins or baffles at the inlet of the velocity unifying member, a decided tendency of the gaseous drying medium to swirl or rotate as the drying medium issues from the outlet end of the velocity unifying member into the spray duct or first drying duct. Due to centrifugal force generated by said swirling or rotation, the sprayed particles tend to adhere to the walls of the spray duct.

We have overcome the last mentioned difficulty by providing, at the outlet end of the velocity unifying member, a plurality of vertically extending fins that bring about straight vertical gas flow. We have further arranged a spray nozzle at the center of these fins, short of the downstream edges thereof. The fins preferably extend radially and the inner corners of the downstream edges of the fins are cut off or shaped so as not to project into the spray cone issuing from the nozzle. By thus placing the nozzle upstream of the spray duct or first drying duct and well inside the velocity unifying member, the spray duct or first drying duct can be shortened correspondingly, since the sprayed particles or droplets enter the gaseous drying medium upstream of the spray duct or drying duct. Actually, the spray nozzle is placed so that the spray cone from the nozzle will have its end approximately coinciding with the inlet of the spray duct.

We have found that undesirable changes tend to occur on drying in a single stage of heat sensitive products, such as milk, which contain, for instance, proteins tending to coagulate on rapid complete drying. We have further found that by subdivision of the dehydration process into two successive stages, fresh gaseous drying medium being supplied between the stages, we can prevent the occurrence, on drying, of such undesirable changes, while effecting as complete a dehydration as may be desired. For this purpose, we may subdivide the stream of gaseous medium established in the air inlet duct into two branches. The first branch enters the velocity unifying member, in the manner disclosed hereinabove, flows through the velocity unifying member and the drying duct and then enters a separator where partially dried solid material is separated from gaseous material. The separated partially dried solid material is suspended in the second branch of the stream of fresh gaseous drying medium and is carried in suspension to a second separator, being further dehydrated while so carried in suspension. The gaseous drying medium from both separators may be sent to a filter type separator for recovery of still suspended extremely fine particles.

We have found that when we employ a vertically arranged spray duct and a gaseous drying medium is caused to flow upwardly therethrough for spray drying material such as milk, a certain proportion of the sprayed particles may be large enough and heavy enough to settle downwardly through the column of gaseous drying medium in spite of the upward flow of the latter. While such particles or flakes do not ordinarily form a major portion of the total number of sprayed particles, yet they may be sufficiently numerous to represent a serious practical problem when the drying medium is introduced from below into the velocity unifying member arranged immediately below the spray duct in vertical alignment therewith. Clearly, the above mentioned large and heavy sprayed particles will cause difficulty if settling downwardly through the velocity unifying member onto said heating elements in the air inlet. Yet, if the gaseous drying medium is caused to flow so rapidly as to prevent completely the settling of any relatively heavy and large particles formed on spraying, then the spray duct must be made that much longer.

Drying of said relatively heavy and large sprayed particles (which do not traverse the whole spray duct when the gaseous drying medium flows upwardly through the spray duct) can be effected by suspending said particles in the second branch of fresh gaseous drying medium referred to hereinabove. Most conveniently, the branching of the original stream of fresh gaseous drying medium is effected near the discharge end of the air inlet duct through which the fresh gaseous drying medium flows. Thus, this duct may be formed in the shape of a T, with the cross member forming a downward continuation of the velocity unifying member. Through the upper part of the cross member, one branch of the stream of fresh gaseous medium flows upwardly into the velocity unifying member, while the other branch flows downwardly through the lower part of the cross member. Then the relatively heavy and large sprayed particles can settle down through the spray duct, through the velocity unifying member and through said cross member of the air duct, to be carried in suspension by said second branch of the fresh gaseous drying medium through any suitable continuation of the lower part of the cross member to a separator. And, if desired, more or less completely dehydrated material separated from the first branch of the gaseous drying medium may be suspended in said second branch at any desired point for further drying along with said settled relatively heavy and large sprayed particles.

In the operation of the spray drier of the present invention, the liquid to be spray dried is subjected, at a relatively low temperature, for instance, 140° F. or less, to a pressure considerably in excess of the nozzle pressure (which, according to our invention, is from 2000 to 2500 pounds per square inch, or higher) and is thereafter quickly raised to a temperature in excess of 230° F., say, from 250° to 260° F. The liquid is then sprayed into the gaseous drying medium within a very short period of time. The total time of exposure of the liquid to an elevated temperature (higher than 230° F.) is less than 4 seconds and preferably less than 1 second. In other words, after the liquid has reached a high temperature, the liquid is sprayed and thereby cooled within the indicated period of time. Thus, because of the short exposure to high temperature, heat sensitive components of the liquids are not injured. For instance, milk can be spray dried without coagulation of proteins with consequent excessively high solubility index. In many instances, the temperature is high enough to sterilize completely the product being sprayed dried.

The above disclosed quick heating followed by cooling within a short time can be brought about by passing the liquid first through a high pressure pump, then through a relatively long but narrow tube immersed within a hot heating medium and finally through a very short tube to the spray nozzle. The flow of the liquid under high pressure through the narrow tube is turbulent, with resultant rapid heating of the liquid. Turbulence is effected by flowing the liquid through the heating tube at a velocity so correlated with the internal tube diameter as to satisfy the following equation:

$$\frac{\text{Velocity in ft./sec.}}{\text{Internal diameter in inches}} \geq 37.5$$

Such a construction and, in particular, the provision of the short tube connecting the heating tube with the spray nozzle, is made possible by the fact that the discharge end of the heating tube can be disposed immediately outside the upper portion of the upper half of the double conical velocity unifying member. At this point, the discharge end of the heating tube is spaced by a short distance from the spray nozzle so that the connecting tube can be made quite short. In a conventional spray drier, the conduit connecting the preheater and the spray nozzle must extend through a large drying chamber and must therefore be made so long that if preheating of milk to 230° F. is carried out, the protein content of milk is coagulated.

Since the liquid is sprayed at a high temperature (above 230° F.) into a gaseous drying medium, there is effected quick or even explosive drying with minimum dependence, for dehydration, on heat transfer from the gaseous drying medium to sprayed particles or droplets. Further, at the indicated high temperatures, the viscosities of the liquids being spray dried are greatly reduced and improved atomization on spraying is effected with resultant more efficient dehydration. Again, it should be noted that these beneficial results can be secured only if the holding time for the liquid at the indicated high temperature is limited as disclosed, at least in the case of liquids containing heat sensitive components, for instance, milk.

Due to the rapid or explosive atomization of the liquid with resultant quick dehydration at the inlet to the spray duct, the gaseous drying medium is cooled and thereby caused to contract to a considerable extent at said inlet. This contraction causes deceleration of the gaseous drying medium and thereby serves to bring about very even gas flow through the spray duct.

The features of the present invention will become apparent from the following description and appended claims as illustrated by the accompanying drawings showing, diagrammatically and by way of example, apparatus according to the present invention. More particularly:

Figure 1 is a side elevation, with parts broken away, taken along the line 1—1 of Figure 3 of an apparatus according to the present invention as installed in a building having two floors;

Figure 2 is another side elevation of the apparatus of Figure 1, with parts broken away, taken along the line 2—2 of Figure 3, with parts shown in vertical section;

Figure 3 is a cross-sectional view taken along the line 3—3 of Figure 1;

Figure 4 is a perspective view of the bag house of the apparatus of Figures 1 and 2;

Figure 5 is an enlarged fragmentary vertical cross-sectional view taken along the line 5—5 of Figure 2;

Figure 6 is a cross-sectional view taken along the line 6—6 of Figure 5;

Figure 7 is a cross-sectional view taken along the line 7—7 of Figure 5;

Figure 8 is a view similar to Figure 1 but showing an apparatus according to this invention arranged for downward vertical flow of gaseous drying medium; and Figure 9 is a vertical cross-sectional view through the velocity unifying member of the apparatus of Figure 9.

In Figures 1 to 7 the reference numeral 10 indicates the air inlet of a duct 12 provided with steam coils 14 for heating the air. The duct 12 extends generally horizontally and communicates through a tapering downwardly inclined conduit 16 with a short vertically extending tube 18 open upwardly and downwardly. Above the tube 18, a velocity unifying member is provided, made up of a lower divergent frusto-conical portion 20 and an upper convergent frusto-conical portion 22. Radially extending intersecting vertical fins or baffles 24 are provided in the bottom of the divergent cone 20 and extend downwardly into the open ended tube 18. At the upper end of the convergent cone 22, radial vertical fins 26 are provided. These fins do not extend all the way to the center of the convergent portion 22 and have their inner upper corners cut away at about 45° angle, as indicated at 27.

For easy removal or replacement, the vanes 26 may extend through vertical slots in the wall of the convergent portion 22 into open-ended sheath-like structures 29 projecting radially from said walls and adapted to hold the outer ends of the vanes 26. The outer upper edge of the vanes 26 may be recessed, as at 26a, and the walls of the structures apertured in alignment therewith, to receive a cotter pin 31 or the like serving to hold the vanes 22 against longitudinal displacement.

A spray nozzle 32 may be disposed at the center of the vanes 26, for upward discharge of liquid to be spray dried. A vertical tube 34 receives the air and sprayed liquid discharged from the cone 22. The upper end of the duct 34 may be tapered for connection with a downwardly extending duct 36 discharging tangentially into a cyclone separator 38. The upper ends of the ducts 34 and 36 may take the form of a removable cap 39.

The liquid to be sprayed through the nozzle 32 flows through a conduit 40 from any suitable container (not shown) to a high pressure pump 42 and therefrom through a narrow conduit 44 into and through a bank of narrow heating tubes 46 surrounded, except for their end portions, by a heating jacket 48. The tubes 46 are interconnected by U-shaped tubular fittings 47. The jacket 48 extends upwardly immediately outside the convergent cone 22, being supported therefrom by brackets 49. A narrow conduit 50 piercing the wall of the cone 22 serves to discharge the liquid from the tubes 46 into the nozzle 32. Steam or other fluid heat exchange media may be admitted to the jacket 48 through a conduit 48a and discharged through a conduit 48b.

The air separated in the cyclone 38 flows through conduits 51 and 52 into a bag house or other filter type separator 54 from which it is vented through a stack 56. A fan or blower 58 is disposed between the conduits 51 and 52. The powder from the separator 38 flows downwardly into a short conduit 59 where it is retained at least for several seconds by two oppositely directed movable flap valves 60 urged into closed position by counterweights 60a. The flap valves 60 thus function as gas lock means.

A frusto-conical conduit 62 communicates with the lower end of the tube 18 and is connected to a lateral duct 63 discharging into a frusto-conical member 64 which also receives, at its upper end, the powder from the duct 59. The material flows from the conical member 64 through a duct 66 into a cyclone separator 68. Gases from the separator 68 flow through a duct 70 into the conduit 51, while powder is discharged from the separator 68 through a conduit 72, preferably provided with flap valves 73 similar to the flap valves 60 in the conduit 59.

The above described apparatus may be housed in a building having a lower floor 76 and a roof 78 apertured to accommodate the parts of the conduits 34 and 36 projecting above the roof. These projecting parts of the conduits 34 and 36 may be covered with insulation 79. A motor 82 may be supported from the bag house 54 for driving the fan 58 through a shaft 84.

In the operation of the above described apparatus, air circulation is effected by the blower or fan 58. Air entering at 10 is heated in the conduit 12 by steam coils 14 and passes through the conduit 16 into the tube 18. The greater part of the air thus heated flows upwardly into the divergent cone 20. The baffles or fins 24 serve to distribute the air uniformly over the cross-sectional area of the upper end of the tube 16 and the lower end of the cone 20. As the air flows upwardly through the divergent cone 20 and the convergent cone 22, uniform upward velocity of gas flow is brought about, as explained in copending Coulter et al. application Serial No. 769,030, filed August 16, 1947, now Patent No. 2,576,264. The fins 26 at the upper end of the cone serve to prevent swirling or rotation of the upwardly flowing air, and in the duct 34 the air flows straight upwardly at velocities that are substantially uniform throughout the cross-sectional area of the duct 34. The rate of upward flow is such that all but the heaviest or largest sprayed droplets or particles are carried along by the air into the duct 36 for separation from the drying air in the separator 38. The heaviest or largest sprayed particles or droplets (including such large or heavy particles as may be built up by agglomeration of original spray particles or droplets) settle gravitationally downwardly through the duct 34 (if initially carried up into this duct), through the convergent cone 22, through the divergent cone 20 and through the tube 18 into the cone 62. Part of the drying air entering the tube 18 from the conduit 16 is diverted downwardly into the cone 62 and carries said heavy or large particles through the duct 63 into the conical member 64, where the powder from the separator 38 is added to said heavy or large particles by discharge through the outlet conduit 59. Thus, all the spray dried particles are carried in suspension through the conduit 66 into the separator 68 for recovery through the conduit 72. The fines still suspended in the drying air are carried in entrainment through conduits 51, 52 and 72 into the bag house 54 for recovery.

The size and dimensions of our spray drying apparatus will vary according to the nature and volume of the liquid to be spray dried. In spray drying about 90 gallons per hour of condensed milk containing about 40% total solids (yielding 300 lbs. per hour of milk powder), the over-all height of the apparatus may be 34 ft. The lower cone 20 may be 4 ft. in height and that of the upper cone 22 about 10 ft., while that of the duct 34 may be 17 ft. The maximum width of the cones may be 7 ft. and the minimum width 2¼ ft. The nozzle 32 may be disposed 4 ft. from the top of the cone 22. The pipe 44 may be made of stainless steel and may have a length of 7 ft. and an internal diameter of ¼ inch. The jacket 48 may be stainless steel or aluminum and may enclose five heating tubes 46 each 5 ft. long and having an outer diameter of ¼ inch and a wall thickness of 0.049 inch. The pipe 50 may be 18" to 26" long, with an outer diameter of ¼ inch and a wall thickness of 0.049 inch.

By way of an example, the operation of the above disclosed apparatus for the spray drying of 90 gallons per hour of condensed whole milk containing 40% total solids is disclosed as follows. The temperature of the milk entering the apparatus less than 140° F., say, 120° F. The temperature of the milk at the moment of spraying is above 230° F., say, 250° to 260° F. The pressure at which the milk is sprayed is above 1500 pounds per square inch, say 3800 to 5000 pounds per square inch. The total time of exposure of the milk to a temperature of 230° F. or higher is less than 4 seconds and preferably less than 2 seconds. In order to reach the indicated spray temperatures and pressures and to stay within the indicated holding time at the high temperature, the milk is pumped at at least 2500 pounds per square inch and preferably at 5000 to 6000 pounds per square inch initial pressure through a jacket containing, say, 25 ft. of tubing, at 20 to 25 ft. per second. This tubing has an inner diameter of 0.152 inch and is characterized by an internal resistance against liquid flow such that, in order to deliver 125 gallons per hour of water at 60° F. and atmospheric pressure, the water must be pumped into the coil at a pressure of 800 pounds per square inch. The length of the tube connecting the heating coil with the nozzle is 18 to 26 inches and the tube has an internal diameter of 0.152 inch. The spray nozzle has an orifice of about 0.030 inch.

The steam pressure around the heating tubes (in the heating jacket) ordinarily ranges from about 40 to 60 pounds per square inch or higher. The exact steam pressure required depends on the cleanness of the inner surface of the heating coil and on the rate of liquid flow through the heating tubes. In practice, the steam pressure is initially adjusted to bring about the desired milk temperature and is thereafter further adjusted as may be required to keep the milk temperature constant.

Drying air at, say, 320° F. enters the spray duct 34 at a rate, for instance, of 5500 cubic ft. per minute and flows upwardly in the spray duct at a velocity of 1000 to 1500 ft. per minute. Immediately above the spray nozzle, the wet bulb temperature may range from 125° to 140° F. At the top of the spray duct 34, the wet bulb temperature may be 170° F. The temperature of the air at the cyclone 38 may be 190° F. The duct 34 may be under a vacuum of 3 inches of water.

About 96% of the total amount of sprayed milk is carried through the duct 34 and the duct 36 into the cyclone 38. The powder discharged from the cyclone 38 contains less than 10% moisture, preferably from 4 to 5%.

About 4% of the sprayed milk settles, in the form of heavy flakes, downwardly through the cones 20 and 22, for drying in the conduits.

The final milk powder recovered in the cyclone 68 is characterized by a moisture content of from 2 to 2½% and a solubility index of 0.1 (as measured by the method adopted by The American Dry Milk Institute). About 300 pounds of milk powder are produced each hour.

Numerous modifications of the method of the above example are possible. For instance, the heating tubes may contain only 15 ft. of tubing. Then a steam pressure of 90 pounds per square inch or higher may be required to raise the milk to 250° to 260° F. If skim milk containing 30% of total solids is spray dried, the spray temperature of the milk may be 270° to 280° F., with a holding time of less than 4 seconds, say, around 2 seconds, the rate of flow being 70 gallons per hour yielding 185 pounds of milk powder per hour. Many other liquids may be spray dried under the conditions described or with conditions modified in view of the solids content, heat sensitivity and other characteristics of the specific material being dried.

Figure 8:
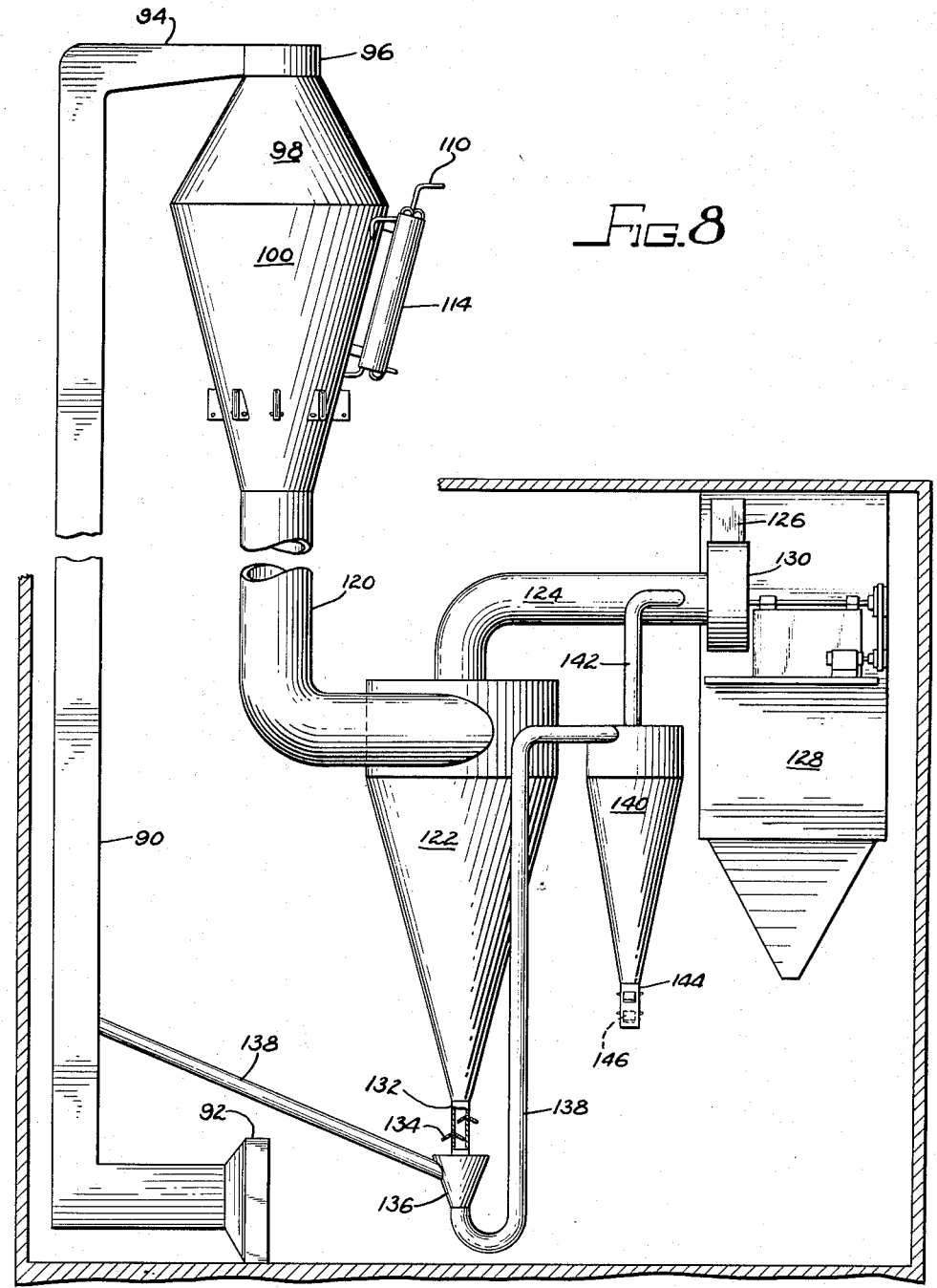

Figures 8 and 9 show apparatus according to the present invention arranged for vertical downward flow of gaseous drying medium. The apparatus includes a generally vertically extending air duct 90 having an air inlet 92 and provided with internal steam coils (not shown) for heating the air. The air duct 90 includes an uppermost horizontal tapering portion 94 communicating with a short vertical duct 96 through a lateral opening in the latter. The duct 96 is closed at its top and opens downwardly into a velocity unifying member made up of an upper divergent frusto-conical member 98 and a lower convergent frusto-conical member 100. Radially extending intersecting vertical fins or baffles 102 are provided in the top of the divergent cone 98 and project upwardly into the duct 96. These fins or baffles 102 serve the same purpose as the fins 24 in the apparatus of Figures 1 to 7. Near the outlet end of the convergent cone 100, radial vertical fins 104 are provided. These fins do not extend all the way to the center of the convergent cone and have their lower inner corners cut away at about 45° angle, as indicated at 106. The fins 104 perform the same function as the fins 26 of the apparatus of Figures 1 to 7 and may be removed and replaced exactly like the fins 26.

A spray nozzle 108 may be disposed at the center of the vanes 104, for downward discharge of liquid to be spray dried. The liquid to be spray dried flows under high pressure through a narrow conduit 110 into and through a bank of narrow heating tubes 112 surrounded, except for their end portions, by a heating jacket 114. The latter extends immediately outside the convergent cone 100, being supported therefrom by brackets 116. A narrow conduit 118 piercing the wall of the cone 100 serves to discharge the liquid from the tubes 112 to the nozzle 108. Steam or other fluid heat exchange media may be admitted to the jacket 114 through a conduit 114a and discharged through a conduit 114b. The various parts described in this paragraph function exactly as the corresponding parts of the apparatus of Figures 1 to 7.

A vertical tube 120 receives the air and sprayed liquid discharged from the cone 100. The lower end of the tube 120 may extend horizontally for tangential discharge into a cyclone separator 122. The air separated in the cyclone 122 flows through conduits 124 and 126 into a bag house 128 or other filter type separator from which the air is vented. A fan or blower 130 is interposed between the conduits 124 and 126. The powder from the separator 122 flows downwardly into a short conduit 132 where it is retained at least for several seconds by two oppositely directed movable flap valves 134 urged into closed position by counterweights. The flap valves 134 thus function as a gas lock means. Except for the downward flow of gaseous drying medium and the downward direction of spraying, the parts of the apparatus of Figures 9 and 10 so far described function similarly to the corresponding parts of the apparatus of Figures 1 to 7.

The conduit 132 discharges into a frusto-conical member 136 which also receives fresh hot gaseous drying medium from the air duct 90 through a conduit 138 branching off from the duct 90. Thus, the powder from the separator 122 is resuspended in fresh hot gaseous drying medium. The resulting suspension moves through a conduit 138 to a cyclone separator 140. The gaseous drying medium flows from the separator 140 through a conduit 142 into the conduit 124 and thus reaches the bag house 128. The powder from the separator 140 is discharged through a conduit 144 provided with two oppositely directed movable flap valves 146 urged into closed position by counterweights.

The apparatus of Figures 8 and 9 differs from the apparatus of Figures 1 to 7 by providing for downward vertical flow of gaseous drying medium in the first step or stage of the drying process. Due to this downward flow, there is no separation by settling of relatively heavy sprayed particles. Instead, all the spray dried particles (except the fine material carried over to the bag house 128) are collected together in the separator 122, resuspended in fresh hot gaseous heating medium for further dehydration and thereafter collected in the separator 140.

It should be understood that many other details in structure and method can be varied without departing from the principles of this invention. It is therefore not our purpose to limit the patent granted on this invention otherwise than necessitated by the scope of the appended claims.

We claim:

1. Apparatus for spray drying a liquid comprising a conduit for a gaseous drying medium including, in sequence, a generally straight portion, means for heating said gaseous drying medium in said portion, an elbow-shaped portion, an erect divergent-convergent portion and an erect tubular portion, a solid-gas separator connected to the discharge end of said erect tubular portion; a spray nozzle in the outlet portion of said divergent-convergent portion; vertical vanes at the inlet end of said divergent-convergent portion projecting into said elbow-shaped portion; and vertical vanes in said divergent-convergent portion about said spray nozzle; said divergent-convergent portion and the vanes therein serving to effect straight vertical flow of said gaseous drying medium into and through said tubular erect portion at a velocity substantially uniform across said erect tubular portion and with said gaseous drying medium distributed substantially uniformly across said erect tubular portion.

2. Apparatus for spray drying a liquid comprising a conduit for a gaseous drying medium including, in sequence, a generally straight portion, means for heating said gaseous drying medium in said portion, an elbow-shaped portion, an erect divergent-convergent portion and an erect tubular portion; a solid-gas separator connected to the discharge end of said erect tubular portion; a spray nozzle in the outlet portion of said divergent-convergent portion; vertical vanes at the inlet end of said divergent-convergent portion projecting into said elbow-shaped portion; vertical vanes in said divergent-convergent portion about said spray nozzle; and suction means for establishing flow of air through said conduit; said divergent-convergent portion and the vanes therein serving to effect straight vertical flow of said gaseous drying medium into and through said tubular erect portion at a velocity substantially uniform across said erect tubular portion and with said gaseous drying medium distributed substantially uniformly across said erect tubular portion.

3. Apparatus for spray drying a liquid comprising a conduit for a gaseous drying medium including, in sequence, a generally straight portion, means for heating said gaseous drying medium in said portion, an elbow-shaped portion, an erect divergent-convergent portion and an erect tubular portion; a solid-gas separator connected to the discharge end of said erect tubular portion; a spray nozzle in the outlet portion of said divergent-convergent portion; a second conduit for said gaseous drying medium branching off from said conduit ahead of said divergent-convergent portion; a second gas-solid separator connected to the discharge end of said second conduit; and means connecting said first separator to said second conduit adjacent the inlet thereof for transfer of partially dried material from said first separator into said second conduit for further dehydration in the latter.

4. Apparatus for spray drying a liquid comprising a conduit for a gaseous drying medium including, in sequence, a generally straight portion, means for heating said gaseous drying medium in said portion, an elbow-shaped portion, an erect divergent-convergent portion and an erect tubular portion; a solid-gas separator connected to the discharge end of said erect tubular portion; a spray nozzle in the outlet portion of said divergent-convergent portion; vertical vanes at the inlet end of said divergent-convergent portion projecting into said elbow-shaped portion; vertical vanes in said divergent-convergent portion about said spray nozzle; a second conduit for said gaseous drying medium branching off from said conduit ahead of said divergent-convergent portion; a second gas-solid separator connected to the discharge end of said second conduit; and means connecting said first separator to said second conduit adjacent the inlet thereof for transfer of partially dried material from said first separator into said second conduit for further dehydration in the latter.

5. Apparatus for spray drying a liquid comprising a conduit for a gaseous drying medium including, in sequence, a generally straight portion, means for heating said gaseous drying medium in said portion, an elbow-shaped portion, an erect divergent-convergent portion, and an erect tubular portion; a solid-gas separator connected to the discharge end of said erect tubular portion; a spray nozzle in the outlet portion of said divergent-convergent portion; and means for preheating said liquid and for conveying the liquid to said spray nozzle, including, in sequence, a pump, a conduit adapted to be immersed in a heating fluid terminating outside said divergent-convergent conduit portion at the level of said nozzle and a conduit piercing the wall of said divergent-convergent conduit portion connecting said conduit adapted to be immersed in a heating fluid with said nozzle.

6. Apparatus for spray drying a liquid comprising a conduit for a gaseous drying medium including, in sequence, a generally straight portion, means for heating said gaseous drying medium in said portion, an elbow-shaped portion, an erect divergent-convergent portion, and an erect tubular portion; a solid-gas separator connected to the discharge end of said erect tubular portion; a spray nozzle in the outlet portion of said divergent-convergent portion; vertical vanes at the inlet end of said divergent-convergent portion projecting into said elbow-shaped portion; vertical vanes in said divergent-convergent portion about said spray nozzle; and means for preheating said liquid and for conveying the liquid to said spray nozzle, including, in sequence, a pump, a conduit adapted to be immersed in a heating fluid terminating outside said divergent-convergent conduit portion at the level of said nozzle and a conduit piercing the wall of said divergent-convergent conduit portion connecting said conduit adapted to be immersed in a heating fluid with said nozzle.

7. Apparatus for spray drying a liquid comprising a conduit for a gaseous drying medium including an inlet portion, means for heating said gaseous drying medium in said portion, an elbow-shaped portion, an erect divergent-convergent portion and an erect tubular portion; a solid-gas separator connected to the discharge end of said erect tubular portion; a spray nozzle in the outlet portion of said divergent-convergent portion; vertical vanes at the inlet portion of said divergent-convergent portion projecting into said elbow-shaped portion; and radially extending vertical vanes in said divergent-convergent portion at the level of said spray nozzle; said radially extending vanes having their inner corners shaped so as not to project into the path of liquid sprayed from said nozzle; said divergent-convergent portion and the vanes therein serving to effect straight vertical flow of said gaseous drying medium into and through said tubular erect portion at a velocity substantially uniform across said erect tubular portion and with said gaseous drying medium distributed substantially uniformly across said erect tubular portion.

8. Apparatus for spray drying a liquid comprising a first conduit for a gaseous drying medium including an inlet portion, means for heating said gaseous drying medium in said portion, an elbow-shaped portion, an erect divergent-convergent portion and an erect tubular portion; a solid-gas separator connected to the discharge end of said erect tubular portion; a spray nozzle in the outlet portion of said divergent-convergent portion; a second conduit for said gaseous drying medium branching off from said first conduit ahead of said divergent-convergent portion; a second gas-solid separator connected to the discharge end of said second conduit; and means including a gas lock valve connecting said first separator to said second conduit adjacent the inlet end of said second conduit for momentary holding and subsequent transfer of partially dried material from said first separator into said second conduit for further dehydration in the latter.

9. Apparatus for spray drying a liquid comprising a conduit for a gaseous drying medium including an inlet portion, means for heating said gaseous drying medium in said portion, an elbow-shaped portion, an erect divergent-convergent portion, and an erect tubular portion; a solid-gas separator connected to the discharge end of said erect tubular portion; a spray nozzle in the outlet portion of said divergent-convergent portion; and means for preheating said liquid and for conveying the liquid to said spray nozzle, including, in sequence, a pump, a first conduit adapted to be immersed in a heating fluid terminating outside the upper portion of said divergent-convergent conduit portion at the level of said nozzle and a second conduit piercing the wall of said divergent-convergent conduit portion and connecting said first conduit adapted to be immersed in a heating fluid with said nozzle, said pump having a capacity sufficient to force said liquid through said first conduit at a rate such as to satisfy the following equation:

$$\frac{\text{Liquid velocity in ft./sec.}}{\text{Internal conduit diameter in inches}} = 37.5$$

10. Apparatus for flowing a column of gas along a path including a point at which the direction of gas flow is changed and for establishing downstream of said point uniformity of gas distribution, of direction of gas flow and of velocity of gas flow, said apparatus comprising, in sequence, a straight conduit, an elbow-shaped conduit, a divergent-convergent conduit and a second straight conduit, said apparatus further comprising a first set of vanes at the inlet end of said divergent-convergent portion extending into said elbow-shaped conduit, said first set of vanes extending axially and radially with respect to said divergent-convergent portion, and a second set of vanes in the outlet end portion of said divergent-convergent portion extending axially and radially with respect thereto.

11. Apparatus for spray drying a liquid comprising a first conduit for a gaseous drying medium having a terminal angular portion, an erect divergent second conduit arranged to receive said gaseous drying medium from said first conduit, an erect convergent third conduit arranged to receive said gaseous drying medium from said second conduit, vertical vanes at the inlet end of said second conduit projecting into the terminal portion of said first conduit, a spray nozzle in the outlet portion of said third conduit directed toward the outlet of said third conduit, vertical vanes in the outlet portion of said third conduit about said nozzle, a fourth conduit arranged to receive the gaseous drying medium and sprayed material discharged from said third conduit, and a separator arranged to receive the gaseous drying medium and sprayed material discharge from said fourth conduit, said second and third conduits and the vanes therein serving to effect straight vertical flow of said gaseous drying medium into and through said fourth conduit with said gaseous medium distributed substantially uniformly across said fourth conduit.

12. Apparatus for spray drying a liquid comprising in combination an inlet for a gaseous drying medium, means for heating said gaseous drying medium, an erect velocity unifying member comprising a divergent frusto-conical inlet portion and a convergent frusto-conical outlet portion, duct means for conveying said heated drying medium to the inlet of the divergent portion of the velocity unifying member, a spray nozzle in the outlet of the divergent-convergent velocity unifying member, an erect tubular member extending from the outlet of the divergent-convergent velocity unifying member and a solid-gas separator connected to the discharge end of said erect tubular member.

13. Apparatus for spray drying a liquid comprising in combination an inlet for a drying gas, means for heating said drying gas, an erect gas velocity unifying member comprising a divergent frusto-conical inlet portion and a convergent frusto-conical outlet portion, duct means for conveying said heated drying gas to the inlet of the divergent portion of the velocity unifying member, vertical vanes in the inlet end of the velocity unifying member, a spray nozzle in the outlet of the divergent-convergent velocity unifying member, vertical vanes about said spray nozzle, an erect tubular member extending from the outlet of the velocity unifying member and a solid-gas separator connected to the discharge end of said erect tubular member.

References Cited in the file of this patent

UNITED STATES PATENTS

| | | |
|---|---|---|
| 788,741 | Trump | May 2, 1905 |
| 1,782,054 | Uhl | Nov. 18, 1930 |
| 2,054,441 | Peebles | Sept. 15, 1936 |
| 2,154,000 | Zizinia | Apr. 11, 1939 |
| 2,289,191 | Hall | July 7, 1942 |
| 2,312,474 | Peebles | Mar. 2, 1943 |
| 2,327,039 | Heath | Aug. 17, 1943 |
| 2,327,889 | Haugh | Aug. 24, 1943 |
| 2,384,998 | Haugh | Sept. 18, 1945 |
| 2,525,224 | Kaiser | Oct. 10, 1950 |

FOREIGN PATENTS

| | | |
|---|---|---|
| 394,912 | Great Britain | July 6, 1933 |

OTHER REFERENCES

"New Minnesota Spray Dryer" by Food Equipment Corp., 221 N. LaSalle St., Chicago, Illinois. (Copy in Div. 46, 159–4.)